United States Patent
Kang et al.

(10) Patent No.: US 7,222,005 B2
(45) Date of Patent: May 22, 2007

(54) ABNORMAL OIL PRESSURE REDUCTION DETERMINATION DEVICE FOR VEHICLE TRANSMISSION

(75) Inventors: Jihoon Kang, Fuji (JP); Yasutaka Kawamura, Fuji (JP); Shigeki Shimanaka, Fuji (JP); Hiroyasu Tanaka, Fuji (JP); Donggyun Park, Fuji (JP); Hirofumi Okahara, Fuji (JP)

(73) Assignee: JATCO Ltd, Fuji-shi (JP)

( * ) Notice: Subject to any disclaimer, the term of this patent is extended or adjusted under 35 U.S.C. 154(b) by 513 days.

(21) Appl. No.: 10/676,266

(22) Filed: Oct. 2, 2003

(65) Prior Publication Data

US 2004/0133318 A1 Jul. 8, 2004

(30) Foreign Application Priority Data

Oct. 4, 2002 (JP) .............................. 2002-291891

(51) Int. Cl.
G01M 3/00 (2006.01)
(52) U.S. Cl. ............................ 701/29; 701/30; 701/31; 701/35; 474/18; 474/28
(58) Field of Classification Search ............ 701/62–63, 701/29; 474/18, 28
See application file for complete search history.

(56) References Cited

U.S. PATENT DOCUMENTS

| | | | | |
|---|---|---|---|---|
| 2,793,803 A | * | 5/1957 | Yerger ......................... | 417/13 |
| 3,774,736 A | * | 11/1973 | Ito et al. ..................... | 192/221 |
| 3,887,049 A | * | 6/1975 | Ito et al. ..................... | 192/221 |
| 4,393,732 A | * | 7/1983 | Suzuki et al. ................ | 477/125 |
| 4,734,682 A | * | 3/1988 | Bond, Jr. .................... | 340/614 |
| 4,823,644 A | * | 4/1989 | Ohkumo ...................... | 477/44 |
| 4,838,125 A | * | 6/1989 | Hamano et al. ............. | 477/129 |
| 5,033,290 A | * | 7/1991 | Seki et al. .................. | 73/118.1 |
| 5,062,050 A | * | 10/1991 | Petzold et al. .............. | 701/68 |
| 5,168,778 A | * | 12/1992 | Todd et al. .................. | 477/49 |

(Continued)

FOREIGN PATENT DOCUMENTS

DE  199 52 476 A1  5/2001

(Continued)

OTHER PUBLICATIONS

Taeyoung Han et al., Engine Oil Viscometer Based on Oil Pressure Sensor, SAE Technical paper series, Jan. 2006.*

(Continued)

*Primary Examiner*—Cuong H. Nguyen
(74) *Attorney, Agent, or Firm*—Foley & Lardner LLP

(57) ABSTRACT

An abnormal oil pressure reduction determining device has an oil pressure sensor which detects a real oil pressure, a sensor which detects a vehicle running state, and a controller which sets an oil pressure command value for an oil pressure control mechanism. The controller computes the lower limiting oil pressure which is possible in the present vehicle running state, and when the real oil pressure is less than this lower limiting oil pressure and the pressure difference between the real oil pressure and oil pressure command value exceeds a reference value, determines that there is an abnormal pressure reduction due to a fault in the oil pressure control mechanism. Even if the oil pressure of the transmission has dropped abnormally due to some reason, the abnormal oil pressure reduction determining device determines the situation without fail.

13 Claims, 8 Drawing Sheets

U.S. PATENT DOCUMENTS

| | | | | |
|---|---|---|---|---|
| 5,207,306 | A | * | 5/1993 | Sato et al. .................. 477/174 |
| 5,315,972 | A | * | 5/1994 | Judy et al. .............. 123/198 D |
| 5,515,272 | A | * | 5/1996 | Sakai et al. .................... 701/29 |
| 5,617,337 | A | * | 4/1997 | Eidler et al. ................. 702/104 |
| 5,707,314 | A | * | 1/1998 | Kashiwabara et al. ........ 477/45 |
| 5,720,692 | A | * | 2/1998 | Kashiwabara ................ 477/45 |
| 5,800,308 | A | * | 9/1998 | Tsutsui et al. .............. 477/116 |
| 6,006,150 | A | * | 12/1999 | Ueda .......................... 701/53 |
| 6,050,917 | A | * | 4/2000 | Gierling et al. ............... 477/45 |
| 6,224,509 | B1 | * | 5/2001 | Gierling ....................... 477/45 |
| 6,243,638 | B1 | * | 6/2001 | Abo et al. .................... 701/51 |
| 6,377,879 | B2 | * | 4/2002 | Kanno ......................... 701/29 |
| 6,591,177 | B1 | * | 7/2003 | Loffler ........................ 701/63 |
| 6,691,012 | B2 | * | 2/2004 | Nishida et al. ............... 701/60 |
| 6,712,651 | B2 | * | 3/2004 | Kanno ........................... 440/1 |
| 6,810,314 | B2 | * | 10/2004 | Tashiro et al. ................ 701/48 |
| 2001/0047232 | A1 | * | 11/2001 | Kanno ......................... 701/29 |
| 2002/0151229 | A1 | * | 10/2002 | Kanno ........................... 440/1 |
| 2002/0183911 | A1 | * | 12/2002 | Tashiro et al. ................ 701/48 |
| 2003/0158646 | A1 | * | 8/2003 | Nishida et al. ............... 701/51 |
| 2004/0133318 | A1 | * | 7/2004 | Kang et al. ................... 701/29 |

FOREIGN PATENT DOCUMENTS

| | | | |
|---|---|---|---|
| JP | 56-049450 A | | 5/1981 |
| JP | 359045518 A | * | 3/1984 |
| JP | 5-240331 A | | 9/1993 |
| JP | 2000219128 A | * | 8/2000 |
| JP | 2001-059570 A | | 3/2001 |
| US | JP4111082677 A | * | 3/1999 |

OTHER PUBLICATIONS

Unknown, ToyotaFinancial.com—Used vehicle protection plans comparison, 2 pages, Apr. 28, 2006.*

* cited by examiner

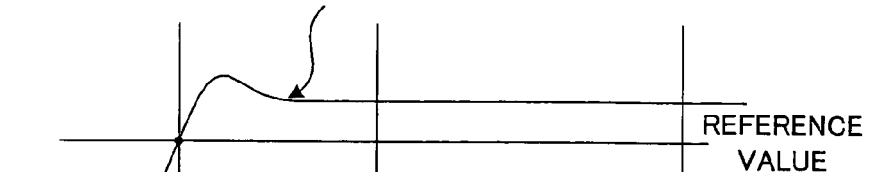
FIG. 6A
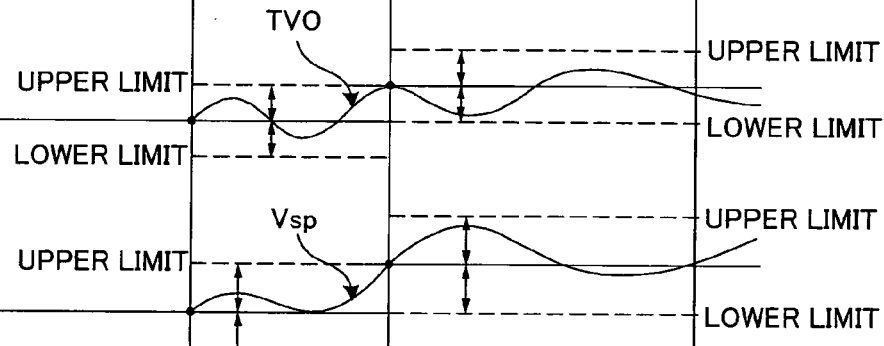
FIG. 6B
FIG. 6C
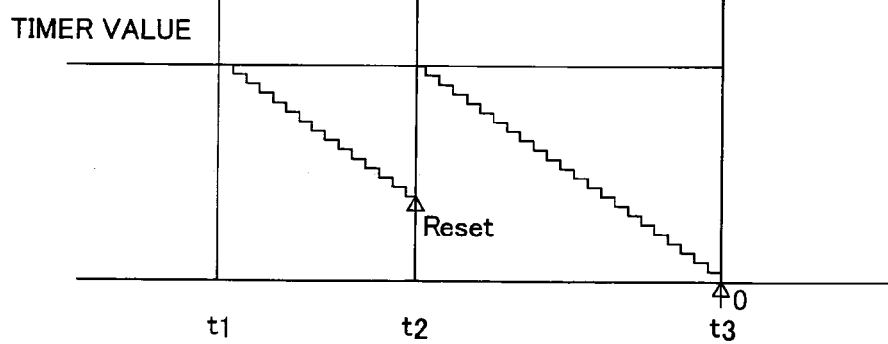
FIG. 6D

ABNORMAL OIL PRESSURE REDUCTION DETERMINATION DEVICE FOR VEHICLE TRANSMISSION

FIELD OF THE INVENTION

This invention relates to an abnormal oil pressure reduction (drop) determination device which can be used for a vehicle transmission controlled by oil pressure.

BACKGROUND OF THE INVENTION

In the prior art, the operation of a vehicle transmission is controlled by oil pressure. For example, in a belt type continuously variable transmission (CVT), torque capacity is adjusted by controlling the oil pressure supplied to a pulley. Torque capacity is the maximum torque which can be transmitted without causing the belt slip of the CVT. Tokkai-Hei 05-240331 published by the Japanese Patent Office in 1993 discloses a belt type CVT wherein, in a transient state where the accelerator pedal stroke (TVO) of the vehicle changes, or a speed change is performed, the oil pressure which adjusts torque capacity is controlled consistently.

SUMMARY OF THE INVENTION

However, in the prior art, even if the supply oil pressure drops temporarily due to some reason, an oil pressure command value is increased so that the required torque capacity is always obtained. For this purpose, an oil pump is operated excessively, and this impairs fuel consumption-performance.

It is therefore an object of this invention to provide an abnormal oil pressure reduction determination device for a vehicle transmission which can determine the situation where the oil pressure of the transmission is decreased abnormally for some reason.

In order to achieve the above object, this invention provides an abnormal oil pressure reduction determination device for use with a transmission of a vehicle, the transmission having an oil pressure control mechanism which performs speed change control using oil pressure. The abnormal oil pressure reduction determination device comprises an oil pressure sensor which detects a real oil pressure, a sensor which detects a vehicle running state, and a microcomputer-based controller which sets an oil pressure command value for the oil pressure control mechanism. The controller functions to compute a lower limiting oil pressure which is possible in the present vehicle running state, compare the real oil pressure with the lower limiting oil pressure, compare the real oil pressure with the oil pressure command value, and when the real oil pressure is less than the lower limiting oil pressure and when a pressure difference between the real oil pressure and oil pressure command value exceeds a reference value, determine that there is an abnormal oil pressure reduction due to a fault in the oil pressure control mechanism.

The details as well as other features and advantages of this invention are set forth in the remainder of the specification and are shown in the accompanying drawings.

BRIEF DESCRIPTION OF THE DRAWINGS

FIG. 6 is a graph describing a determination of a continuous abnormal oil pressure reduction. FIG. 6A shows a time variation of a difference D1 between an oil pressure command value and a real oil pressure. FIG. 6B shows a time variation of an accelerator pedal stroke (throttle valve opening) (TVO). FIG. 6C shows a time variation of a vehicle speed (Vsp). FIG. 6D shows a time variation of a timer value for measuring the duration of an abnormal oil pressure reduction.

DESCRIPTION OF THE PREFERRED EMBODIMENTS

Figure 1:
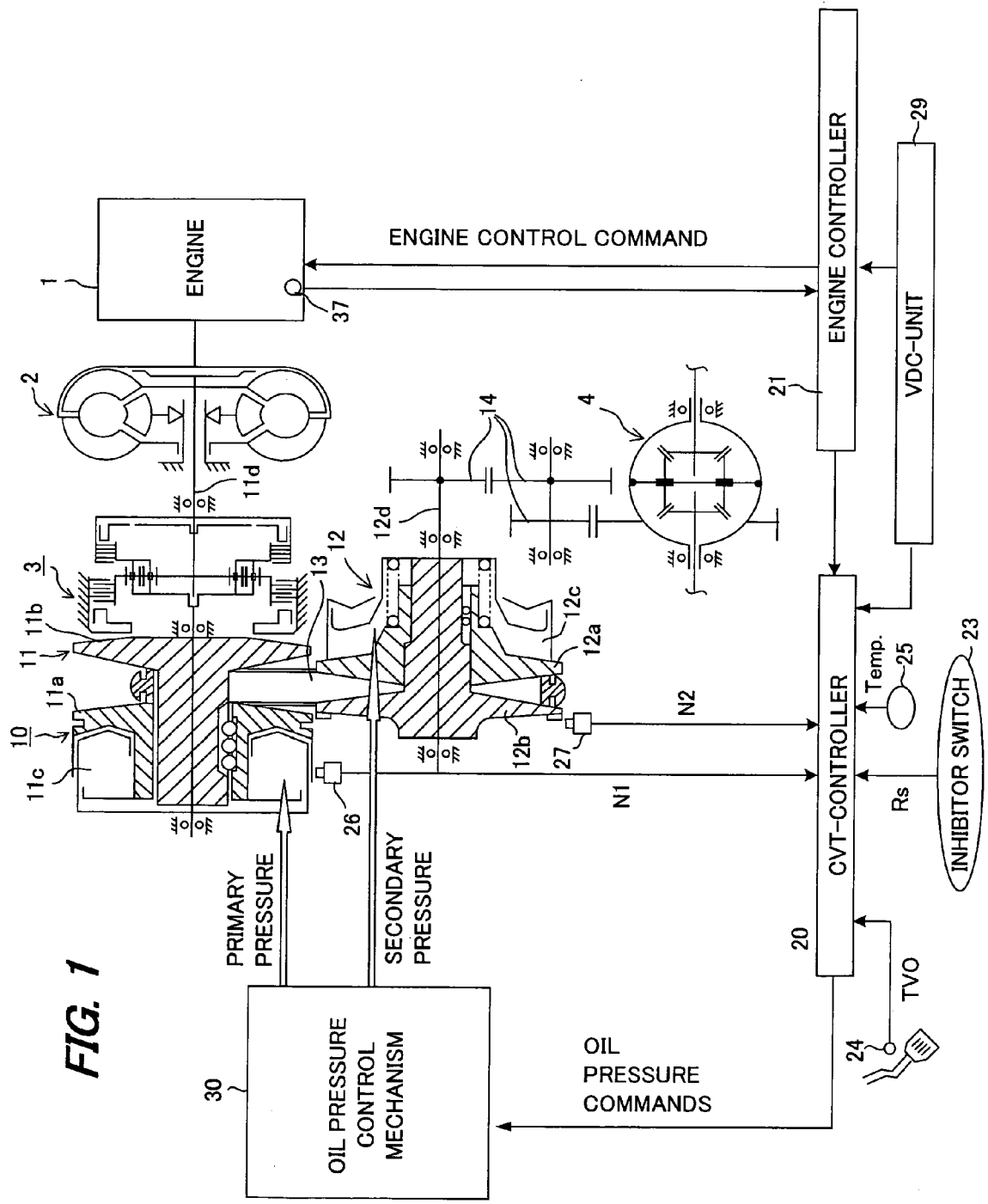
FIG. 1 is a schematic view showing an abnormal oil pressure reduction determination device for a vehicle transmission.

FIG. 1 shows one embodiment of a determination device for determining an abnormal oil pressure reduction of a vehicle transmission according to this invention.

A torque converter 2, forward/reverse change-over mechanism 3 and a transmission 10 form a transmission system. In this embodiment, a belt type continuously variable transmission is used as the transmission 10. The transmission 10 is provided with a primary pulley 11, secondary pulley 12, V belt 13, CVT controller 20 and oil pressure control mechanism 30.

The primary pulley 11 is an input shaft pulley which inputs the rotation of the engine 1 to the transmission 10. The primary pulley 11 is provided with a fixed conical plate 11b which rotates together with the input shaft 11d, and a movable conical plate 11a which can displace in an axial direction. The movable conical plate 11a faces the fixed conical plate 11b to form a V-shaped pulley groove, and is displaced in the axial direction by an oil pressure (primary pressure) which acts on a primary pulley cylinder chamber 11c. The primary pulley 11 is connected to the engine 1 via the forward/reverse change-over mechanism 3 and the torque converter 2 provided with a lock-up clutch, and inputs the rotation of the engine 1. The rotation speed N1 of the primary pulley 11 is detected by a primary pulley rotation speed sensor 26. The rotation speed Ne of the engine 1 is detected by an engine rotation speed sensor 37.

The V belt 13 is wound around the primary pulley 11 and the secondary pulley 12, and transmits the rotation of the primary pulley 11 to the secondary pulley 12. The secondary pulley 12 outputs the rotation transmitted by the V belt 13 to a differential 4. The secondary pulley 12 is provided with a fixed conical plate 12b which rotates together with an output shaft 12d, and comprises a movable conical plate 12a which can be displaced. The movable conical plate 12a faces the fixed conical plate 12b to form a V-shaped pulley groove, and is displaced in an axial direction by the oil pressure (secondary pressure) which acts on a secondary pulley cylinder chamber 12c. The pressure-receiving surface area of the secondary pulley cylinder chamber 12c is set approximately equal to the pressure-receiving surface area of the primary pulley cylinder chamber 11c.

The secondary pulley 12 is connected to the differential 4 via an idler gear 14 and an idler shaft, and transmits rotation to the differential 4. The rotation speed N2 of the secondary pulley 12 is detected by a secondary pulley rotation speed sensor 27. A vehicle speed can be computed from the rotation speed N2 of the secondary pulley 12. The forward/reverse change-over mechanism 3 disposed between the engine and a CVT speed change part is a common type comprising a planetary gear, a forward clutch, and a reverse clutch (or reverse brake). The clutches change a power transfer path. The forward clutch and reverse clutch are engaged/released by supply/non-supply of oil pressure. When the vehicle advances, due to the oil pressure (forward clutch pressure) supplied to a forward clutch piston chamber, the forward clutch engages with the planetary gear and the fixed conical plate 11b rotates clockwise.

On the other hand, when the vehicle reverses, due to the oil pressure (reverse clutch pressure) supplied to a reverse clutch piston chamber, the reverse clutch engages with the planetary gear and the fixed conical plate 11b rotates counterclockwise. In the neutral state (neutral range and parking range), both the forward clutch and reverse clutch are released.

Signals from an inhibitor switch 23, accelerator stroke amount sensor 24, oil temperature sensor 25, primary pulley rotation speed sensor 26, secondary pulley rotation speed sensor 27, oil pressure sensor 28, vehicle-dynamics-control (VDC) unit 29, engine rotation speed sensor 37 and an input torque signal (engine torque signal) from an engine controller 21 are inputted into the CVT controller 20. Based on these signals, the CVT controller 20 determines a speed ratio and contact frictional force. Herein, the speed ratio is a value obtained by dividing the effective radius of the secondary pulley 12 by the effective radius of the primary pulley 11, and is identical to the pulley ratio. The CVT controller 20 transmits a command to the oil pressure control mechanism 30 to control the transmission 10, and determines whether or not the oil pressure of the transmission dropped abnormally. The specific details of this determination are described later.

The VDC unit 29 and the engine controller 21 are microcomputer-based controllers. Also, the CVT controller 20 included in the abnormal oil pressure reduction determination device comprises a microcomputer which is provided with a central processing unit (CPU) which executes programs, read-only memory (ROM) which stores programs and data, random access memory (RAM) which stores the computation result of the CPU and acquired data temporarily, one or more timers for measuring time, and an input/output interface (I/O interface).

The inhibitor switch 23 is a sensor which detects the position of a shift lever (not shown) used so that a driver may select the operating range of the transmission system. The shift lever position and the operating range of the transmission system have a 1:1 correspondence. The inhibitor switch 23 sends out a range signal Rs showing the position of the shift lever to the CVT controller 20. The accelerator stroke amount sensor 24 detects the stroke of an accelerator pedal. The oil temperature sensor 25 detects the oil temperature supplied to the pulley cylinder chambers of the transmission 10. The oil pressure sensor 28 detects the oil pressure acting on the cylinder chamber 12c of the secondary pulley 12.

The oil pressure control mechanism 30 operates according to a command from the CVT controller 20. The oil pressure control mechanism 30 supplies oil pressure to the primary pulley 11 and the secondary pulley 12, and causes the movable conical plate 11a and the movable conical plate 12a to move to and fro in the respective rotation axis direction. The movement of the movable conical plate 11a and movable conical plate 12a varies the pulley groove width, so the V belt 13 displaces on the primary pulley 11 and the secondary pulley 12. Due to this, the contact radius of the V belt 13 with the primary pulley 11 and the secondary pulley 12 varies, and the speed ratio and contact frictional force received by the V belt 13 are controlled.

The rotation of the engine 1 is inputted into the transmission 10 via the torque converter 2 and the forward/reverse change-over mechanism 3, and is transmitted from the primary pulley 11 to the differential 4 via the V belt 13 and the secondary pulley 12. The rotation speed of the engine 1 detected by the engine rotation speed sensor 37 is inputted into the CVT controller 20 via the engine controller 21, or it is directly inputted into the CVT controller 20.

If the accelerator pedal is depressed or the operating range of the transmission system is changed in the manual mode, the movable conical plate 11a of the primary pulley 11 and movable conical plate 12a of the secondary pulley 12 will displace in the respective axial direction. Due to the variation of the contact radius with the V belt 13, the speed ratio varies continuously.

Figure 2:
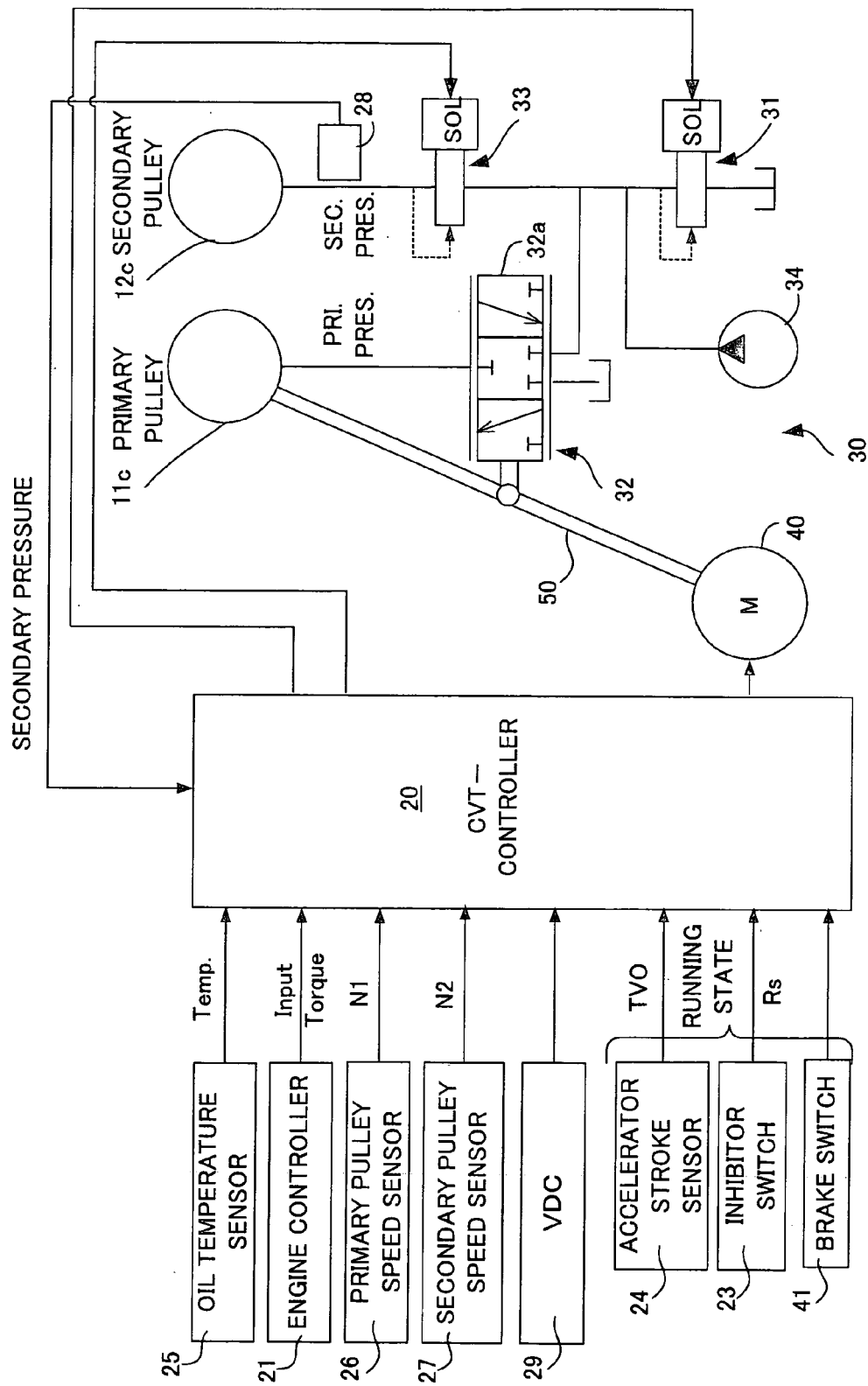
FIG. 2 is a schematic view of an oil pressure control mechanism for a vehicle transmission, and a CVT controller.

FIG. 2 is a conceptual diagram of the oil pressure control mechanism 30 and of the CVT controller 20 of the transmission according to this invention. The oil pressure control mechanism 30 is provided with a regulator valve 31, a speed change control valve 32 and a pressure reduction valve 33. It controls the oil pressure supplied from an oil pump 34, and supplies it to the primary pulley 11 and the secondary pulley 12.

The regulator valve 31 is an escape valve comprising a solenoid, and regulates the pressure of the oil supplied from an oil pump 34 to a predetermined line pressure PL according to a running state of the vehicle according to commands (for example, a duty signal etc.) from the CVT controller 20.

The speed change control valve 32 controls the oil pressure (henceforth "primary pressure") of the primary pulley cylinder chamber 11c to coincide with a primary pulley target oil pressure (i.e. primary oil pressure command value) described later. The speed change control valve 32 is connected with a servo link 50 forming a mechanical feedback mechanism, and is driven by a step motor 40 connected to the end of the servo link 50. The groove width, i.e., real speed ratio, is fed back from the movable conical plate 11a of the primary pulley 11 connected to the other end of the servo link 50. The speed ratio control valve 32 extracts or inputs oil pressure from or to the primary pulley cylinder chamber 11c according to the displacement of the spool 32a. The primary pressure is thereby adjusted so that the target speed ratio specified by the rotation position of a step motor 40 is attained, and after an actual speed change-over is completed, the spool 32a is held in the closed valve position in response to the displacement from the servo link 50.

The pressure reducing valve 33 is provided with a solenoid, and controls the pressure (henceforth "secondary pressure") supplied to the secondary pulley cylinder chamber 12c, to a secondary pulley target oil pressure (i.e. secondary oil pressure command value) described later. The line pressure PL supplied from the oil pump 34, which was regulated by the regulator valve 31, is supplied to the speed change control valve 32 and pressure reduction valve 33, respectively.

The speed ratio of the primary pulley 11 and the secondary pulley 12 is controlled by the step motor 40 driven according to a speed change command signal from the CVT controller 20. The spool 32a of the control valve 32 is driven according to the displacement of the servo link 50 in response to the step motor 40. Due to this, the line pressure PL supplied to the speed change control valve 32 is adjusted, a primary pressure is supplied to the primary pulley 11, the groove width is controlled, and a predetermined speed ratio is attained.

The CVT controller 20 reads the shift lever position from the inhibitor switch 23, the accelerator pedal stroke from the accelerator stroke sensor 24, the oil temperature of the transmission 10 from the oil temperature sensor 25, and signals from the primary pulley speed sensor 26, the secondary pulley speed sensor 27, the oil pressure sensor 28 and the vehicle-dynamics-control (VDC) unit 29. By reading this data, the speed ratio and the contact frictional force of the V belt 13 are controlled, and it is determined whether an abnormal reduction in oil pressure occurred as described later. The VDC unit 29, in order to prevent lateral instability of the vehicle, controls the engine 1, braking system and the oil pressure system.

The CVT controller 20 controls the present speed ratio to a target speed ratio by determining a target speed gear ratio according to the vehicle speed or throttle opening, and driving the step motor 40. The CVT controller 20 also controls the thrust of the primary pulley 11 and secondary pulley 12, i.e., the oil pressure, according to the input torque to the transmission 10, speed ratio of the transmission 10, oil temperature and target speed change rate. The input torque to the transmission 10 corresponds to the output torque from the torque converter 2 and is computed by CVT controller 20 based on the engine torque from the engine controller 21 and the ratio between the output rotation speed and input rotation speed of the torque converter 2.

Figure 3:
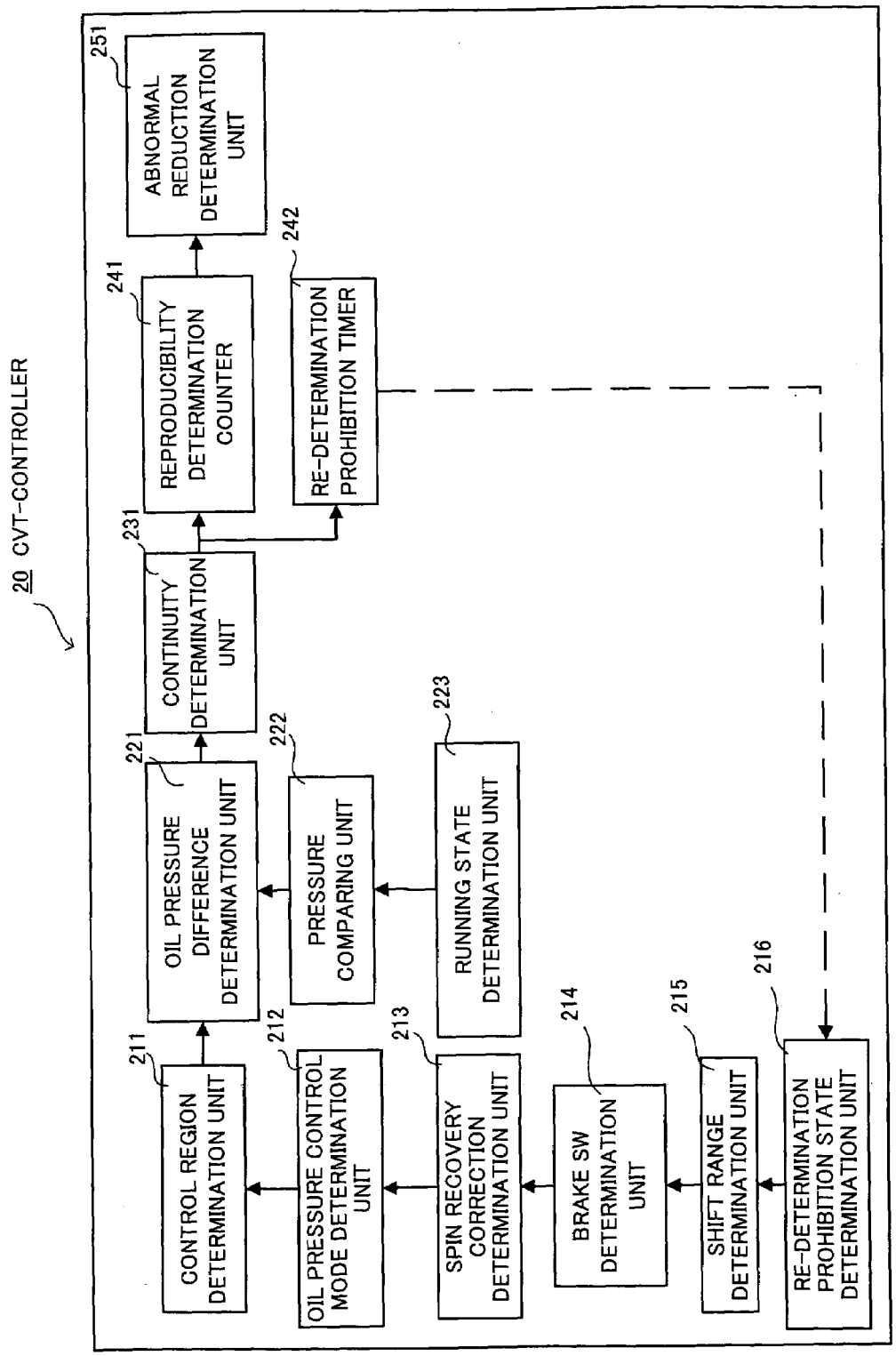
FIG. 3 is a block diagram showing the control performed by the CVT controller of the abnormal oil pressure reduction determination device.

Referring to the block diagram of FIG. 3, the abnormal oil pressure reduction determination of the CVT controller 20 will now be described. In FIG. 3, each section is an imaginary section showing a function performed by the microcomputer of the CVT controller 20.

A control region determination unit 211 determines whether or not the engine rotation speed and secondary pressure are in a region in which feedback control of secondary pressure is possible. Specifically, the control region determination unit 211 calculates a difference D1 of the real oil pressure of the secondary pulley and a target oil pressure for the secondary pulley (i.e. secondary oil pressure command value), and determines whether or not the secondary pressure is in a region where the secondary oil pressure command value can be attained. Herein, the case where feedback control of secondary pressure cannot be performed is for example the case that the engine rotation speed is low, or the case that the oil pressure sensor 28 has a fault. As the oil pump 34 which supplies secondary pressure is usually driven by the engine 1, if the engine rotation speed is lower than a predetermined rotation speed, the oil pump cannot generate sufficient oil pressure. Therefore, when the engine does not reach the predetermined rotation speed, feedback control of secondary pressure is not performed. When the oil pressure sensor 28 has a fault, a precise real oil pressure cannot be obtained for the secondary pressure, and a detection error may occur. Therefore, feedback control is not performed in this case, either. Hence, the control region determination unit 211 determines whether the vehicle is in a state where feedback control of the secondary pressure cannot be performed, based on signals corresponding to the engine rotation speed and the real secondary oil pressure.

An oil pressure control mode determination unit 212 determines whether or not an oil pressure control mode is an ordinary mode. Herein, the ordinary mode is a mode in which the oil pressure command values are set based on the input torque to the transmission 10 and speed ratio of the transmission 10. A non-ordinary mode is a mode in which the oil pressure command values are set regardless of the balance between the oil amount supplied from the pump 34 and the oil amount used, for example in the case where the oil temperature is in a very low temperature region, or the case where the operating range of the transmission system is changing. The very low temperature region may be a region below a predetermined temperature (for example, −30° C.). In other words, if the temperature is very low, the viscosity of the oil is high, so the oil pressure is taken as the maximum pressure which can possibly be generated. Also, when the operating range of the transmission system is changing, in order to ensure the oil pressure required to engage the clutch of the forward/reverse change-over mechanism 3, the oil pressure (line pressure) supplied to the pulley is limited. As a result, the target oil pressure is not determined based on the input torque and speed ratio, and an abnormal oil pressure reduction in the oil pressure control mechanism 30 cannot be determined by the difference D1 between the secondary oil pressure command value and real secondary pressure. To detect this situation, the oil pressure control mode determination unit 212 determines whether or not the vehicle is in the aforesaid ordinary mode based on an oil temperature signal from the oil temperature sensor 25 and a range signal Rs from the inhibitor switch 23.

A spin recovery correction determination unit 213 determines whether or not the VDC unit 29 is performing spin recovery correction. Spin recovery correction means that, when vehicle sideslip prevention control is being performed in order to prevent the vehicle from running unstably when the tires slip, the oil pressure is increased to a limit determined by the balance between the supply oil amount and used oil amount, and further the engine torque is limited. During spin recovery correction, when the dynamic frictional coefficient between the vehicle tires and road surface increases, a torque acts from the vehicle wheels on the transmission 1 in the reverse direction, and a correction must be performed for this reverse torque. Therefore, during spin recovery correction, since the extent of the torque input in the reverse direction is unknown, the oil pressure is increased to a limit and further the engine torque is limited. As the engine torque is limited, the engine rotation speed is suppressed low, and thereby the oil pressure which can be generated by the oil pump 34 is low. Even if the reduction of oil pressure is determined in this state, the real oil pressure of the secondary pulley cannot be increased to the secondary oil pressure command value, and thus the determination of abnormal oil pressure reduction will be incorrect. Therefore, the determination is not performed at this time. To avoid performing the determination of abnormal oil pressure reduction during spin recovery correction, by the spin recovery correction determination unit 213, it is determined whether or not spin recovery correction is being performed based on a control signal from the VDC unit 29 and a vehicle speed signal.

A brake SW determination unit 214 determines whether or not a brake switch 41 is OFF. Even if the brake switch 41 is ON, a torque is input from the engine to the transmission 1, and a torque is input from the vehicle wheels to the transmission 1 in the reverse direction, so a correction must be made for this reverse torque. When the brake switch 41 is ON, the torque input in the reverse direction is normally larger than the torque input from the engine. As a result, the input torque to the transmission 10 is corrected, taking into account the torque input in the reverse direction, and the target oil pressure (i.e. oil pressure command value) is set based on the corrected input torque. Due to this, the secondary oil pressure command value becomes sufficiently large. Also, when the brake switch 41 is ON, the engine rotation speed is suppressed low, so a fairly large oil pressure cannot be generated. However, the secondary oil pressure command value is high because of the correction for the reverse torque. If oil pressure reduction is determined in this state, since the real oil pressure of the secondary pulley cannot be increased to the secondary oil pressure command value, the oil pressure reduction will be incorrectly determined.

Therefore, when the brake switch 41 is ON, an oil pressure reduction determination is not performed. In order to avoid performing the oil pressure reduction determination when the brake switch 41 is ON, a signal is input from the brake switch 41, and ON/OFF of the brake switch 41 is determined in the brake SW determination unit 214.

In a shift range determination unit 215, it is determined whether or not the shift range position is in a position other than the N range position, based on a range signal Rs. When the shift range position is the N range position, the command value of the line pressure is set to the oil pressure which can really be generated (i.e. the oil pressure above a lower limit), and it is further set to a value lower than an upper limit below which oil pump noise is sufficiently low. Therefore, in this case also, there is a possibility that the real oil pressure for the secondary pulley cannot be increased to the secondary oil pressure command value, so it is determined in the shift range determination unit 215 whether or not the shift range position is outside the N range position.

A re-determination prohibition state determination unit 216 determines whether or not re-determination of oil pressure reduction can be performed based on a signal from a re-determination prohibition timer 242, described later. Specifically, to verify that the oil pressure reduction is reproducible and to avoid incorrect determination, a re-determination is permitted by the re-determination prohibition state determination unit 216 after the unit 216 determines that a second predetermined time period has elapsed in the re-determination prohibition timer 242.

An oil pressure difference determination unit 221 determines whether or not the secondary oil pressure command value and the real secondary pressure effectively coincide. Specifically, if the oil pressure difference D1 between a secondary oil pressure command value issued to the pressure reduction valve 33 and the real secondary pressure of the oil pressure sensor 28 is less than a reference value, the real secondary pressure effectively coincides with the secondary oil pressure command value, so it is determined that an abnormal oil pressure reduction is absent. If the oil pressure difference D1 is more than the reference value, it is determined that an abnormal oil pressure is present. Hence, in the oil pressure determination unit 221, it is determined whether or not the real oil pressure of the secondary pulley has effectively reached the secondary oil pressure command value. Herein, the reference value of the pressure difference D1 between the secondary oil pressure command value and real secondary pressure is set taking account of the detection precision of the oil pressure sensor and variations in the performance of the oil pressure control mechanism 30.

A pressure comparing unit 222 determines whether or not the real oil pressure is less than a lower limiting oil pressure. The oil pump 34 cannot generate an oil pressure below the lower limiting oil pressure under the present operating conditions of the oil pressure control mechanism 30. Herein, the oil pump 34 is driven by the engine 1, so the lower limiting oil pressure depends mainly on the engine rotation speed. However, the lower limiting oil pressure is also affected by the oil temperature and variations (e.g. variations in initial performance or temporal variation in performance due to deterioration) in the condition of the components of the oil pressure control mechanism 30 (in particular, the oil pump). Therefore, the lower limiting oil pressure is computed also taking account of these factors. Thus, when the pressure is less than the lower limiting oil pressure, it is determined that there is a fault of some kind in the oil pressure control mechanism 30.

A running state determination unit 223 determines whether or not the vehicle is running steadily, based on the throttle opening and vehicle speed variation. The throttle opening is normally equivalent to an accelerator pedal stroke. Herein, the steady state means a state which is not a transient state. A transient state is the rapid acceleration state or rapid deceleration state of the vehicle. When the vehicle is in a transient state, there is a large deviation between the secondary oil pressure command value and real secondary pressure, and there is a high possibility of incorrect determination of the absence/existence of an abnormal oil pressure reduction. Therefore, in order to perform an oil pressure reduction determination only in the steady state, the running state determination unit 223 determines whether or not the vehicle is in a steady running state. Herein, when there is a throttle opening variation larger than about ±0.5/8, it may determined that the vehicle is in a transient state. (Here, the maximum throttle opening is 8.) This is because even when the vehicle is running at a fixed speed, the throttle opening normally fluctuates to this extent of ±0.5/8.

A continuity determination unit 231 determines whether or not an abnormal drop of the oil pressure has continued for more than a first predetermined time period. This eliminates noise, and prevents incorrect determination of abnormal oil pressure reduction. The continuity determination unit 231 comprises a timer for measuring the duration of the abnormal oil pressure reduction.

When a state where the oil pressure difference D1 between the secondary oil pressure command value and real secondary pressure is larger than the reference value with the vehicle in a steady running state, and the real oil pressure is less than the lower limiting oil pressure, continues for more than the first predetermined time period, the continuity determination unit 231 finally determines that the oil pressure has dropped abnormally due to a fault in the oil pressure control mechanism 30.

A reproducibility determination counter 241 increases by unity when the continuity determination unit 231 determines an abnormal reduction of the oil pressure due to a fault in the oil pressure control mechanism 30. Specifically, the reproducibility determination counter 241 counts the number of occasions when the abnormal oil pressure reduction is determined in the continuity determination unit 231.

A re-determination prohibition timer 242 is a timer which prohibits re-determination within the second predetermined time period after the reproducibility determination counter 241 has increased by unity. After the second predetermined time period has elapsed, a re-determination prohibition state determination unit 216 permits re-determination. Hence, by re-determining abnormal oil pressure reduction after the second predetermined time period has elapsed, temporarily detected oil pressure reductions are eliminated, and abnormal oil pressure reductions due to a fault in the oil pressure control mechanism 30 are more reliably determined.

An abnormal reduction determination unit 251 determines whether or not the value of the reproducibility determination counter 241 is equal to or more than a predetermined counter value. If this determination is positive, it means that the abnormal reduction is reproducible, and occurs repeatedly. In this way, incorrect determination can be prevented. If the value of the reproducibility determination counter 241 is equal to or more than the predetermined counter value, a countermeasure control flag is set to unity. When the countermeasure control flag is set to unity, control for performing a countermeasure against abnormal pressure reduction is performed later.

Figure 4:
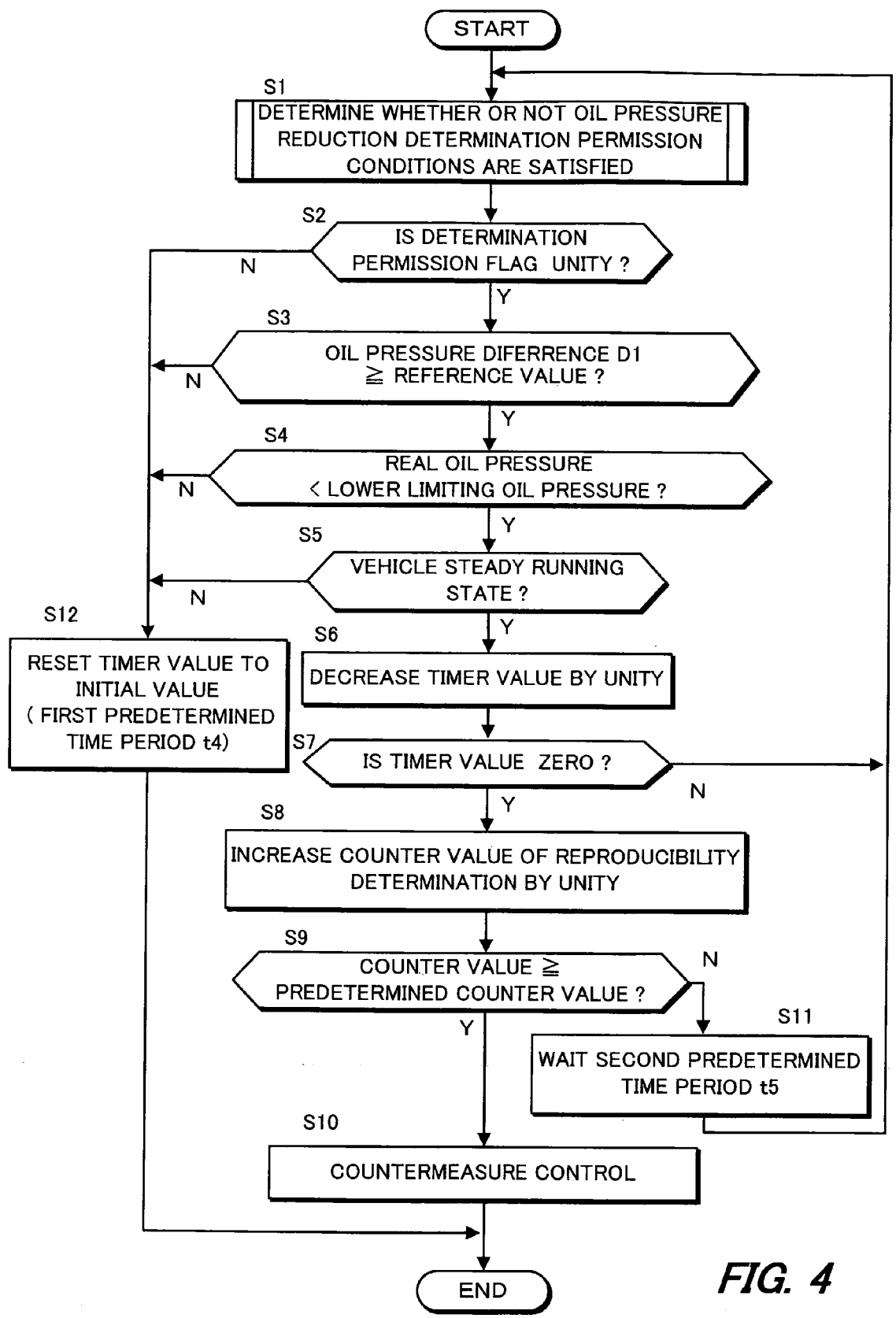
FIG. 4 is a flowchart showing a control routine performed by the CVT controller of the abnormal oil pressure reduction determination device.

The flowchart of FIG. 4 shows the control routine executed by the CVT controller 20 in the abnormal oil pressure reduction determining device of the vehicle transmission according to this invention. This control routine is implemented as a program executed by a microcomputer.

In a Step S1, it is determined whether or not oil pressure reduction determination permission conditions are satisfied. When the oil pressure reduction determination permission conditions are satisfied, the determination permission flag is set to unity. When the oil pressure reduction determination permission conditions are not satisfied, the determination permission flag is set to zero. The details of a subroutine of the Step S1 will be described later.

In a Step S2, it is determined whether or not the determination permission flag is set to unity. If the determination permission flag is set to unity (i.e. the oil pressure reduction determining permission conditions are satisfied), the routine proceeds to a Step S3, and if the determination permission flag is set to zero, the routine proceeds to a Step S12.

In a Step S3, by the oil pressure difference determination unit 221, it is determined whether or not the difference D1 between the secondary oil pressure command value and real secondary pressure is equal to or more than a reference value. When the difference D1 is equal to or more than the reference value, the routine proceeds to a Step S4, and when the difference D1 is not equal to or more than the reference value, the routine proceeds to the Step S12.

In the Step S4, by the pressure comparing unit 222, it is determined whether or not the real oil pressure is less than the lower limiting oil pressure under the present running conditions. When it is less than the lower limiting oil pressure, the routine proceeds to a Step S5, and when it is equal to or more than the lower limiting oil pressure, the routine proceeds to the Step S12.

In the Step S5, by the running state determination unit 223, it is determined whether or not the running state of the vehicle is the steady running state. When it is the steady running state, the routine proceeds to a Step S6, and when it is a transient running state, the routine proceeds to the Step S12.

In a Step S6, it is determined that there has already been an abnormal oil pressure reduction, so the timer value for measuring the duration of the abnormal oil pressure reduction is decreased by unity.

In a Step S7, by the continuity determination unit 231, it is determined whether or not the abnormal oil pressure reduction has continued for a first predetermined time period or longer, i.e., it is determined whether or not the timer value for measuring the duration of the abnormal oil pressure reduction is zero. When the abnormal oil pressure reduction has continued for the first predetermined time period or longer, i.e. the timer value is zero, the routine proceeds to a Step S8, and when it has not continued for the first predetermined time period, the routine returns to the Step S1.

In the Step S8, the counter value of the reproducibility determination counter 241 is incremented by unity. In a Step S9, it is determined whether or not the counter value of the reproducibility determination counter 241 is equal to or more than a predetermined counter value. When it is equal to or more than the predetermined counter value, the routine proceeds to a Step S10, and if it is less than the predetermined counter value, the routine proceeds to a Step S11.

In the Step S10, it is determined that an abnormal oil pressure reduction occurred due to a fault in the oil pressure control mechanism 30, so by the abnormal reduction determination unit 251, the countermeasure control flag is set to unity.

In the Step S11, by the re-determination prohibition timer 242, after incrementing the abnormal determining counter value by unity in the Step S8, the routine waits for the second predetermined time period to elapse, and the routine then returns to the Step S1.

In the Step S12, the timer for measuring the duration of the abnormal reduction in the continuity determination unit 231 is reset to its initial value which corresponds to the first predetermined time period.

The aforesaid control routine is repeatedly performed with a timer interrupt processing in a very short interval (e.g., ten milliseconds). However, taking account of the case that the control routine has not terminated within the very short interval due to the waiting time in the Step S11, interrupt during execution of the control routine is prohibited.

Figure 5:
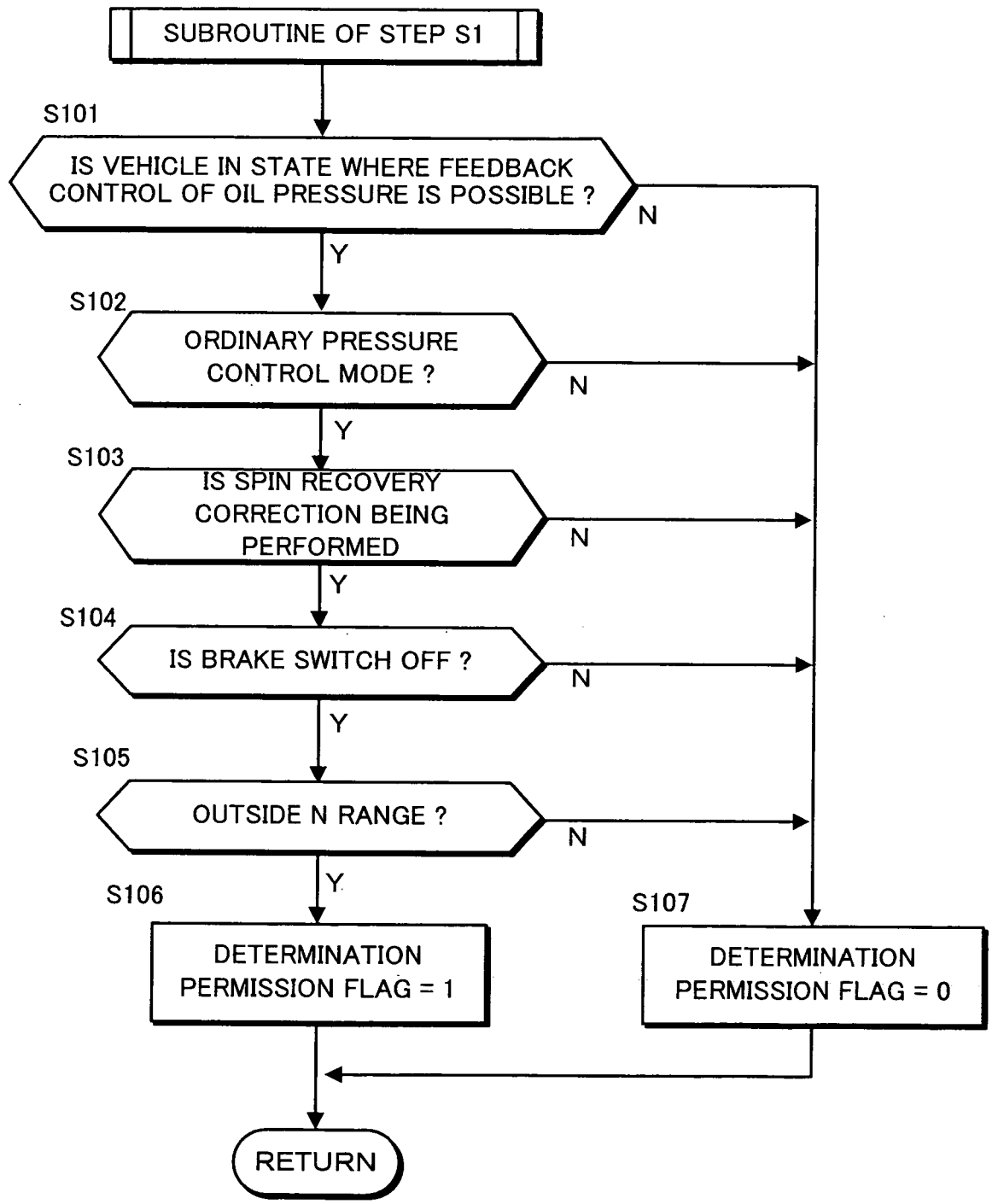
FIG. 5 is a flowchart specifically showing a subroutine of a Step S1 of FIG. 4.

The flowchart of FIG. 5 shows the details of the subroutine of the Step S1 of FIG. 4.

In a Step S101, by the control region determination unit 211, it is determined whether or not the vehicle is in a state where feedback control of the secondary pressure is possible. If the vehicle is in a state where feedback control is possible, the routine proceeds to a Step S102, and if the vehicle is a state wherein feedback control is impossible, the routine proceeds to a Step S107. Specifically, it is determined whether the engine rotation speed is higher than a predetermined rotation speed, or whether there is a fault in the oil pressure sensor 28. For example, when the signal from the oil pressure sensor 28 is interrupted, it is determined that there is a fault in the oil pressure sensor 28.

In the Step S102, by the oil pressure control mode determination unit 212, it is determined whether or not the oil pressure control mode is the ordinary mode. In the case of the ordinary mode, the routine proceeds to a Step S103, and in the case of a non-ordinary mode, the routine proceeds to the Step S107. Specifically, it is determined whether the oil temperature is a very low temperature, or whether the operating range of the transmission system is changing, based on the range signal Rs.

In the Step S103, by the spin recovery correction determination unit 213, it is determined whether or not spin recovery correction is being performed. If spin recovery correction is being performed by the VDC unit 29, the routine proceeds to a Step S104, and if spin recovery correction is not being performed, the routine proceeds to the Step S107.

In the Step S104, by the brake SW determination unit 214, it is determined whether the brake switch 41 is OFF. If the brake switch 41 is OFF, the routine proceeds to a Step S105, and if the brake switch 41 is ON, the routine proceeds to the Step S107.

In the Step S105, by the shift range determination unit 215, it is determined whether or not the shift range position is outside the N range position based on the range signal Rs. If it is outside the N range, the routine proceeds to a Step S106, and if it is the N range, the routine proceeds to the Step S107.

In the Step S106, it is determined that an oil pressure reduction determination permission condition is satisfied, and the determination permission flag is set to unity. In the Step S107, it is determined that the oil pressure reduction determination permission condition is not satisfied, and the determination permission flag is set to zero.

Next, referring to the graph of FIG. 6, the determination for the continuity of abnormal oil pressure reduction will be described.

As shown in FIG. 6A, at a time t1, if the pressure difference D1 between the secondary oil pressure command value and real secondary pressure is more than a reference value, it is determined that oil pressure reduction has occurred (Step S3). In this state, it is determined whether or not the vehicle is in the steady running state (Step S5), as shown in FIGS. 6B and 6C. In other words, it is determined whether or not the accelerator pedal stroke (TVO) and vehicle speed (Vsp) have remained within the permitted range continuously for the first predetermined time period or longer, taking the accelerator pedal stroke (TVO) and the vehicle speed (Vsp) at the time t1 as references. The permitted range of the accelerator pedal stroke (TVO) is a range centered on the accelerator pedal stroke (TVO) at the time t1, and is bounded by a permitted upper limit and permitted lower limit. The permitted range of the vehicle speed (Vsp) is a range centered on the vehicle speed (Vsp) at the time t1, and is also bounded by a permitted upper limit and permitted lower limit.

If the steady running state collapses before the timer value for measuring the duration of the abnormal oil pressure reduction becomes zero, the timer is reset (Step S12). For example, in FIG. 6C, this is the case where the vehicle speed at a time t2 is more than the permitted upper limit. Next, taking the accelerator opening (TVO) and vehicle speed (Vsp) at this time t2 as new reference values, it is determined whether or not a state wherein the accelerator opening (TVO) and vehicle speed (Vsp) are within the permitted range relative to the new reference values, continues for the first predetermined time period.

Next, in FIG. 6D, if the timer value is zero at a time t3, it is determined that there was a fault in the oil pressure control mechanism 30. In this case, the reproducibility determination counter is incremented by unity (Step S8).

Figure 7:
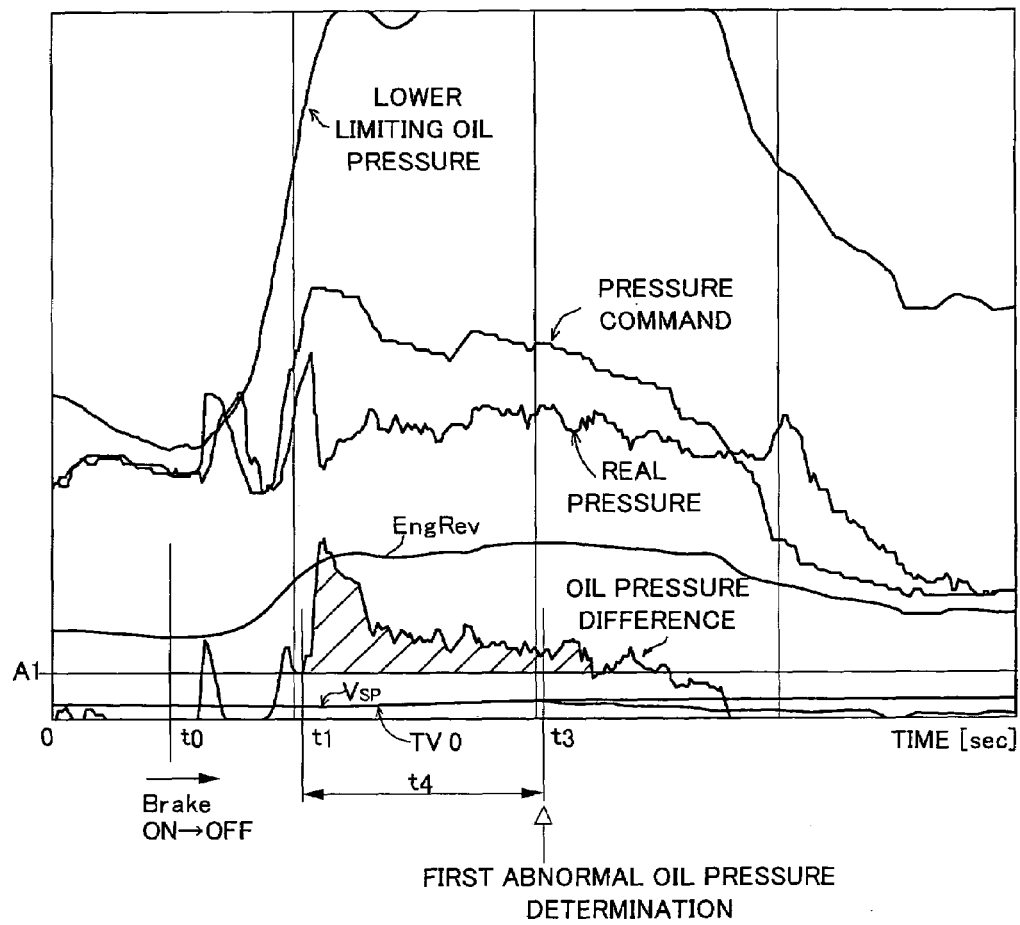
FIG. 7 is a graph describing an abnormal oil pressure reduction determination.

Referring to the graph of FIG. 7, the determination of abnormal oil pressure reduction will now be described. In FIG. 7, the horizontal axis is the time axis. The vertical axis with an arbitrary unit shows oil pressure, vehicle speed (Vsp), accelerator pedal stroke (TVO) and engine rotation speed (EngRev).

In FIG. 7, the process of the Step S101 determines a secondary feedback control permission region wherein the engine rotation speed is higher than the predetermined rotation speed and the oil pressure sensor 28 does not have a fault. The process of the Step S102 determines an ordinary mode wherein the operating range of the transmission is not changing and the oil temperature is not a very low temperature. The process of the Step S103 determines that spin recovery correction is not being performed. The process of the Step S104 determines that the brake switch 41 switches from ON to OFF at a time t0. The process of the Step S105 determines that the shift lever position is the D range position. In the above situation, oil pressure reduction determination conditions are satisfied (Step S106). Hence, as shown by the shading in FIG. 7, the oil pressure difference D1 (secondary oil pressure command value—real secondary oil pressure) at the time t1 is more than a reference value A1 (Step S2). In the process of the Step S4, the real oil pressure is less than the lower limiting oil pressure. In the case of the steady running state wherein variations of the accelerator pedal stroke (TVO) and the vehicle speed (Vsp) are small (Step S5), it is determined in the Step S6 that there is an abnormal oil pressure reduction due to a fault in the oil pressure control mechanism 30, and the continuation time (duration) of the abnormal oil pressure reduction is measured from the time t1. If this abnormal oil pressure reduction continues beyond the time t3 for a period longer than the first predetermined time period t4 (Step S7), an abnormal oil pressure is determined for the first time, and in a Step S8, the reproducibility determination counter is incremented by unity.

Figure 8:
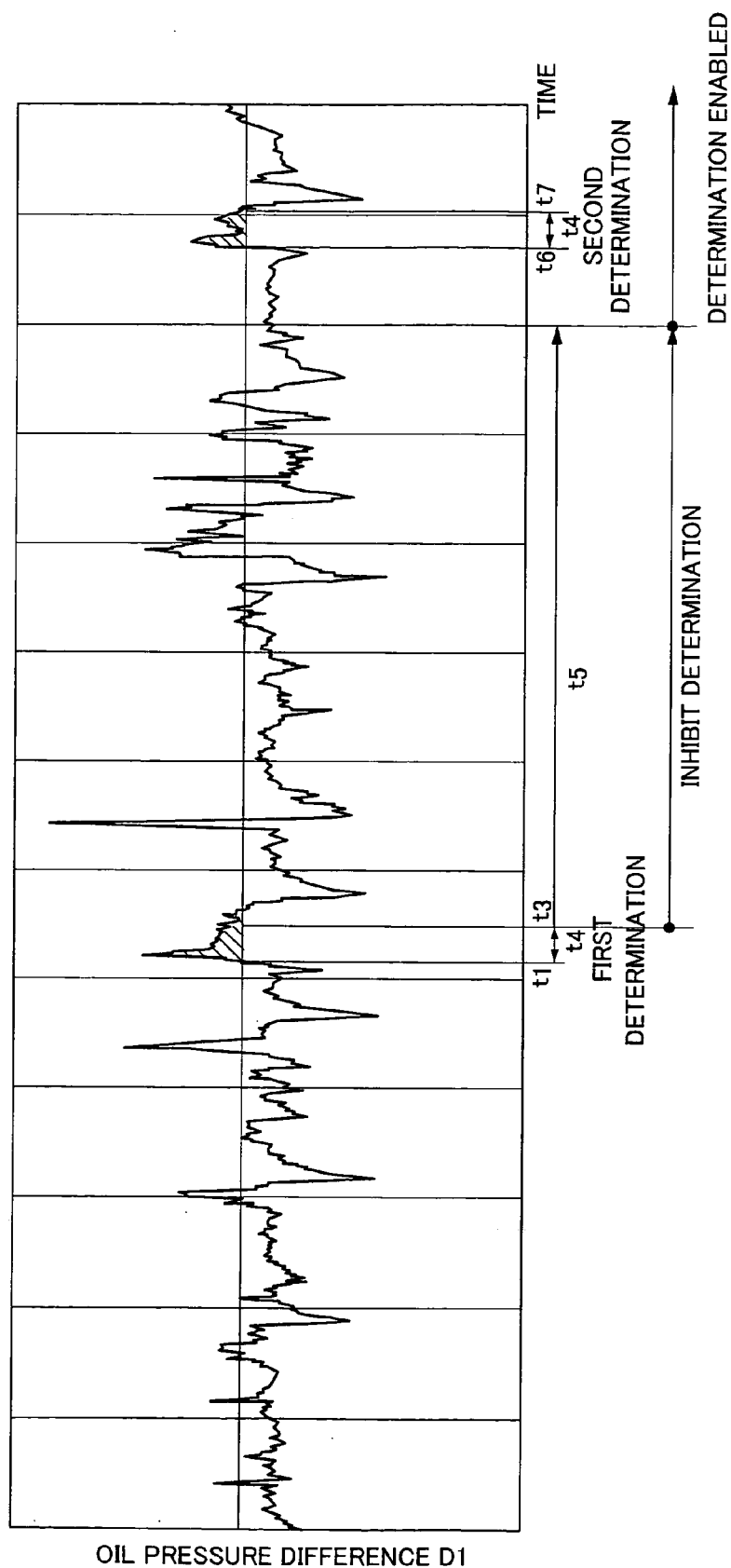
FIG. 8 is a graph describing the reproducibility determination for the abnormal oil pressure reduction, which expands FIG. 7 to earlier and later timings.

Referring to the graph of FIG. 8, the determination of reproducibility of abnormal oil pressure reduction will now be described. The graph of FIG. 8 is a graph which enlarges FIG. 7 with respect to time.

When the second predetermined time period has elapsed (Step S11) since the last increment of the reproducibility determination counter (Step S8), it is again determined whether or not there is a fault in the oil pressure control mechanism 30 as described above (Steps 1–7). As shown by the shading in FIG. 8, after a second predetermined time period t5 has elapsed from the time t3, during an interval from a time t6 to the time t7, it is again determined whether there was a fault in the oil pressure system. When a fault is determined in the oil pressure system 30 in this way, the reproducibility determination counter is incremented by unity in the Step S8. In the determination of the Step S9, if the value of the reproducibility determination counter is equal to or more than a predetermined counter value, it can be determined for certain that there is a fault in the oil pressure control mechanism 30, and that the oil pressure has abnormally decreased due to this reason. This predetermined counter value of the reproducibility determination counter may conveniently be determined based on system reliability and the required precision, and may be 2, 3 or a higher number.

The effect of this embodiment will now be described. If the state wherein the pressure difference D1 between the command pressure and real pressure continues for the first predetermined time period t4 or longer, it is determined that there is an abnormal pressure reduction. As a result, noise is eliminated, and an incorrect determination is prevented. Also, if the real oil pressure is less than the lower limiting oil pressure which naturally arises in the vehicle running state, it is determined that there is an abnormal oil pressure reduction. Consequently, a precise determination can be made.

By providing the reproducibility determination counter, it is determined whether or not an abnormal reduction has occurred on multiple occasions. As a result, incorrect determination is prevented, and an abnormal oil pressure reduction due to a fault in the oil pressure control mechanism can be more precisely determined. By providing the re-determination prohibition timer, a re-determination is performed after the second predetermined time period t5 has elapsed. Due to this, temporary reductions are eliminated, and an abnormal oil pressure reduction due to a fault in the oil pressure control mechanism 30 can be more precisely determined.

When the secondary pressure cannot be feedback controlled (e.g., when the engine rotation speed is low or there is a fault in the oil pressure sensor 28), when the oil pressure control mode is not the ordinary mode (e.g., when the oil temperature is a very low temperature, or the operating range of the transmission system is changing), when spin recovery correction is being performed, when the brake switch 41 is ON, when the selected range is a range outside the N range, or when the vehicle running state is the transient state (e.g., rapid acceleration or rapid deceleration), oil pressure reduction determination is inhibited. As a result, incorrect determination of oil pressure reduction due to a fault in the oil pressure control mechanism 30 is definitively prevented.

The entire contents of Japanese Patent Application P2002-291891 (filed Oct. 4, 2002) are incorporated herein by reference.

Although the invention has been described above by reference to a certain embodiment of the invention, the invention is not limited to the embodiment described above.

In the above embodiment, the case is described where the CVT speed change part is controlled by oil pressure, but also in the case of an abnormal reduction of oil pressure in the mechanism which controls the forward/reverse change-over mechanism by oil pressure, abnormal reduction of the oil pressure can be determined by an identical construction. Further, although in the above embodiment, a difference D1 between the real oil pressure of the secondary pulley and the oil pressure command value for the secondary pulley is calculated, a difference D1 between the real oil pressure of the first pulley and the oil pressure command value for the first pulley may be calculated to detect an abnormal reduction of oil pressure in the oil pressure control mechanism 30. Also, this invention may likewise be applied to the case where the transmission is a stepwise transmission having planetary gears.

Modifications and variations of the embodiment described above will occur to those skilled in the art, in light of the above teachings. The scope of the invention is defined with reference to the following claims.

What is claimed is:

1. An abnormal oil pressure reduction determination device for use with a transmission of a vehicle with an engine, the transmission having an oil pressure control mechanism which comprises an oil pump driven by a rotation of the engine and performs speed change control using oil pressure from the oil pump, the abnormal oil pressure reduction determination device comprising:

an oil pressure sensor which detects a real oil pressure, a sensor which detects a vehicle running state including a rotation speed of the engine, and a controller which sets an oil pressure command value for the oil pressure control mechanism, the controller comprising a microcomputer, wherein:

the controller functions to:

compute a lower limiting oil pressure which is possible in the vehicle running state, based on the rotation speed of the engine, compare the real oil pressure with the lower limiting oil pressure, compare the real oil pressure with the oil pressure command value, and when the real oil pressure is less than the lower limiting oil pressure and when a pressure difference between the real oil pressure and the oil pressure command value exceeds a reference value, determine a presence of an abnormal oil pressure reduction due to a fault in the oil pressure control mechanism.

2. The abnormal oil pressure reduction determining device as defined in claim 1, wherein the controller functions to measure a time, and when the pressure difference between the oil pressure command value and the real oil pressure continuously exceeds the reference value for a first predetermined time period or longer, functions to determine that there is an abnormal oil pressure reduction.

3. The abnormal oil pressure reduction determining device as defined in claim 1, wherein the controller functions to count a number of occasions when the pressure difference between the oil pressure command value and the real oil pressure continuously exceeded the reference value for a first predetermined time period or longer, and when the number of occasions is equal to or more than a predetermined count value, functions to determine that there is an abnormal oil pressure reduction.

4. The abnormal oil pressure reduction determining device as defined in claim 3, wherein the controller further functions to increase the count only when a situation where the pressure difference between the oil pressure command value and the real oil pressure continuously exceeded the reference value for the first predetermined time period or longer occurred after a second predetermined time has elapsed since a last increment of the count.

5. The abnormal oil pressure reduction determining device as defined in claim 1.

wherein the controller further functions to inhibit the determination of the presence of an abnormal oil pressure reduction when the rotation speed of the engine is less than a predetermined rotation speed.

6. The abnormal oil pressure reduction determining device as defined in claim 1, wherein the controller further functions to inhibit the determination of the presence of an abnormal oil pressure reduction when there is a fault in the oil pressure sensor.

7. The abnormal oil pressure reduction determining device as defined in claim 1, wherein the vehicle further comprises a shift lever and a sensor which detects the shift lever position and generates a corresponding range signal, and wherein the controller further functions to:

determine whether or not an operating range of the transmission is changing based on the range signal, and when the operating range of the transmission is changing, inhibit the determination of the presence of an abnormal oil pressure reduction.

8. The abnormal oil pressure reduction determining device as defined in claim 1, further comprising a sensor which detects an oil temperature, wherein the controller further functions to inhibit the determination of the presence of an abnormal oil pressure reduction when the oil temperature is less than a predetermined oil temperature.

9. The abnormal oil pressure reduction determining device as defined in claim 1, wherein the vehicle further comprises a vehicle dynamics control unit which performs spin recovery correction to prevent sideslip of the vehicle, and wherein the controller further functions to inhibit the determination of the presence of an abnormal oil pressure reduction when the spin recovery correction is being performed.

10. The abnormal oil pressure reduction determining device as defined in claim 1, wherein the vehicle further comprises a brake switch which detects ON/OFF of the brake, and wherein the controller further functions to inhibit the determination of the presence of an abnormal oil pressure reduction when the brake switch is ON.

11. The abnormal oil pressure reduction determining device as defined in claim 1, wherein the vehicle further comprises a shift lever, and a sensor which detects a shift lever position and generates a corresponding range signal, and wherein the controller further functions to inhibit the determination of the presence of an abnormal oil pressure reduction when the range signal is a neutral range signal.

12. The abnormal oil pressure reduction determining device as defined in claim 1, further comprising an accelerator pedal stroke sensor which detects an accelerator pedal stroke and a sensor which detects vehicle speed, wherein the controller further functions to determine the vehicle running state based on the accelerator pedal stroke and the vehicle speed, and when the vehicle running state is a rapid acceleration state or rapid deceleration state, functions to inhibit the determination of the presence of an abnormal oil pressure reduction.

13. An abnormal oil pressure reduction determination method for use with a transmission of a vehicle with an engine, the transmission having an oil pressure control mechanism which comprises an oil pump driven by a rotation of the engine and performs speed change control using oil pressure from the oil pump, the abnormal oil pressure reduction determination method comprising the steps of:

detecting a real oil pressure, detecting a vehicle running state including a rotation speed of the engine, setting an oil pressure command value for the oil pressure control mechanism, computing a lower limiting oil pressure which is possible in the vehicle running state, based on the rotation speed of the engine, comparing the real oil pressure with the lower limiting oil pressure, comparing the real oil pressure with the oil pressure command value, and determining that there is an abnormal oil pressure reduction due to a fault in the oil pressure control mechanism when the real oil pressure is less than the lower limiting oil pressure and when a pressure difference between the real oil pressure and the oil pressure command value exceeds a reference value.

* * * * *